Aug. 18, 1925.

A. W. EWING 1,550,525

TRANSMISSION DRIVEN SPEEDOMETER

Filed Jan. 13, 1925

Inventor
A. W. Ewing
By D. Swift
Attorney

Aug. 18, 1925.     1,550,525
A. W. EWING
TRANSMISSION DRIVEN SPEEDOMETER
Filed Jan. 13, 1925     2 Sheets-Sheet 2

Inventor
A. W. Ewing
By
Attorney

Patented Aug. 18, 1925.

1,550,525

UNITED STATES PATENT OFFICE.

ARTHUR WATTERSON EWING, OF NEVADA, MISSOURI.

TRANSMISSION-DRIVEN SPEEDOMETER.

Application filed January 13, 1925. Serial No. 2,115.

*To all whom it may concern:*

Be it known that I, ARTHUR W. EWING, a citizen of the United States, residing at Nevada, in the county of Vernon and State of Missouri, have invented a new and useful Transmission-Driven Speedometer; and I do hereby declare the following to be a full, clear, and exact description of the invention, such as will enable others skilled in the art to which it appertains to make and use the same.

The invention relates to driving mechanisms for speedometers used on motor driven vehicles and has for its object to provide means whereby the speedometer is driven through gear connections with the transmission drive shaft, and within the transmission casing where the gear connections are entirely protected from grit and foreign matter and in which positions the gears operate in oil, thereby positively preventing wearing of the gears incident to grit and dirt as is now the common difficulty where the speedometer is driven by a gear carried by one of the wheels of the automobile.

A further object is to provide the inner section of the universal joint casing with a sleeve surrounding the transmission shaft within the transmission casing, and spaced from the shaft, and to provide a rotatable worm gear rotatable within the sleeve, and rotatable with the shaft through a slot and pin connection with the shaft. Also to provide a sleeve with outwardly extending bearing members, in which members the pintles of a driven gear are rotatably mounted, and a drive shaft connected to one of said pintles extending upwardly through the transmission casing cover to a flexible shaft which leads to a speedometer.

With the above and other objects in view the invention resides in the combination and arrangement of parts as hereinafter set forth, shown in the drawing, described and claimed, it being understood that changes in the precise embodiment of the invention may be made within the scope of what is claimed without departing from the spirit of the invention.

In the drawing:—

Figure 1:
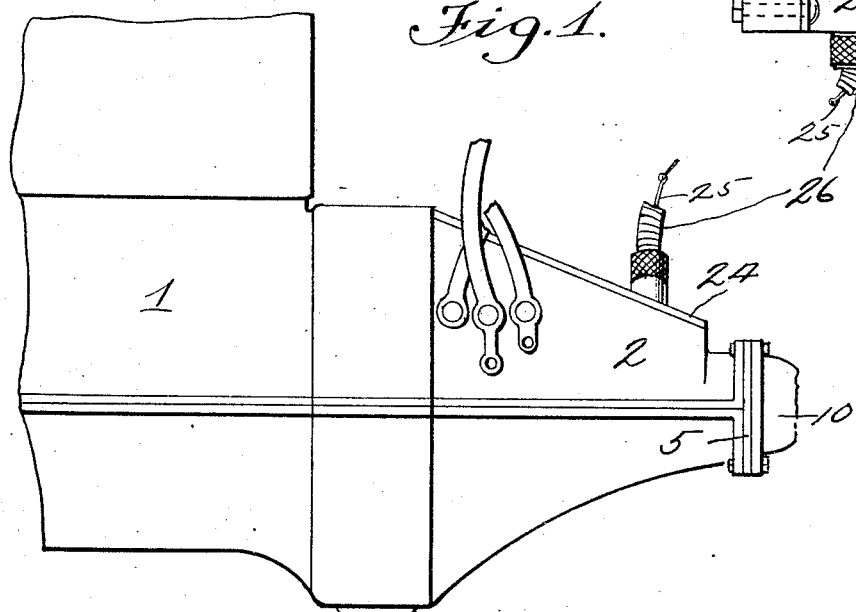
Figure 1 is a side elevation of the rear end of a conventional form of internal combustion engine, showing the device applied thereto.
Figure 2:
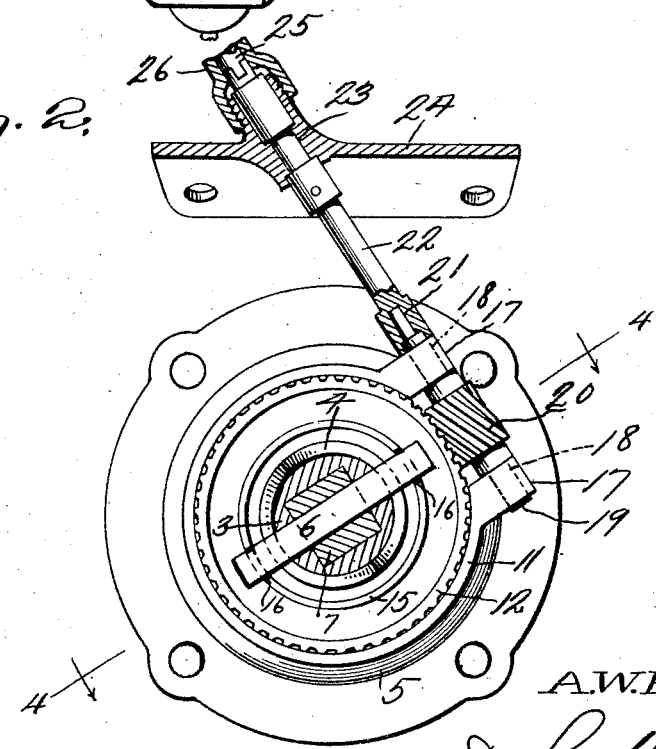
Figure 2 is a transverse sectional view through the transmission drive shaft and a portion of the cover showing the device applied thereto.
Figure 3:
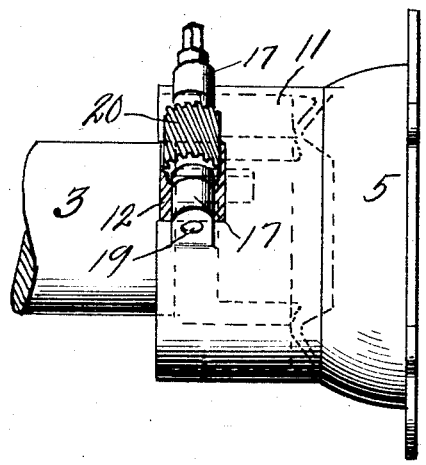
Figure 3 is a side elevation of the sleeve.
Figure 4:
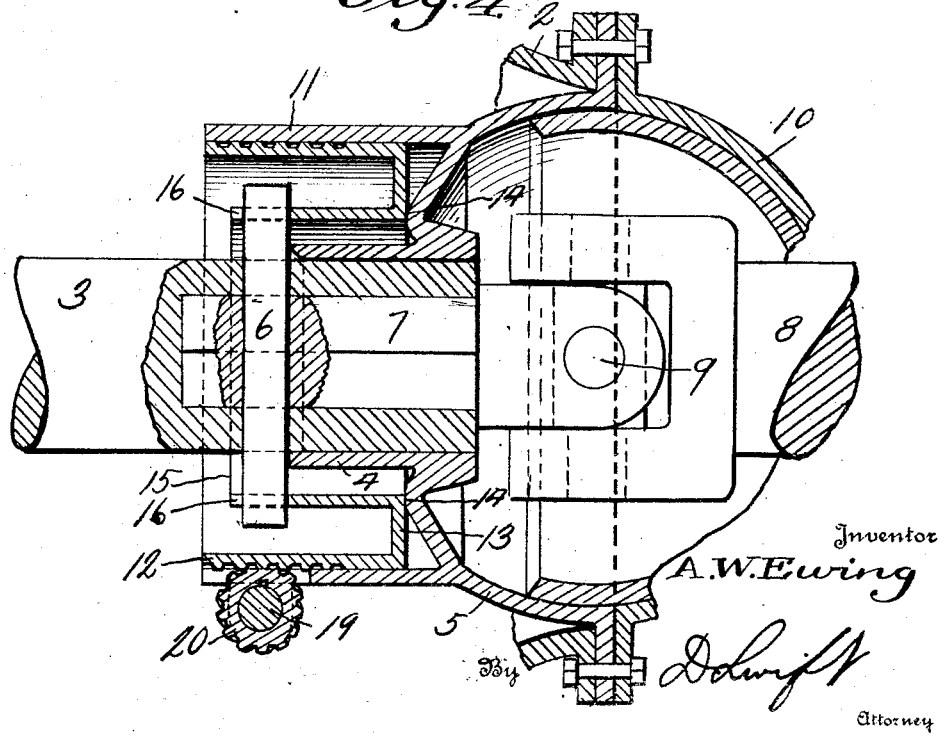
Figure 4 is a longitudinal sectional view taken on line 4—4 of Figure 2.

Referring to the drawing, the numeral 1 designates a conventional form of internal combustion engine of the unit power plant type, and 2 the transmission casing, in which casing is rotatably mounted a transmission drive shaft 3. The rear end of the drive shaft 3 is rotatably mounted in a sleeve 4 of the semi-spherically shaped universal joint casing 5 in the usual manner, and is of the usual construction. Secured in the rear end of the transmission shaft 3 by means of the pin 6 is a rectangular shaped shaft 7, the rear end of which connected to the drive shaft 8 by means of a universal joint 9. Universal joint 9 is disposed within the rear semi spherically shaped section 10 of the universal joint casing, and which casing allows freedom of movement of the shaft 8, and at the same time protects the universal joint from dirt and foreign matter.

Extending rearwardly from the universal casing sections 5 and surrounding the shaft 3 and annular flange 4 in spaced relation thereto, is an annular flange 11, and within which flange 11 is rotatably mounted a worm gear ring 12. Gear ring 12 is interposed between the flanges 11 and 4, and at its inner end terminates in an inwardly extending flange 13 extending towards the transmission shaft 3 and in engagement with the semi spherical section 5 of the universal joint casing at 14, therefore it will be seen that the gear 12 is limited in its movement towards the universal joint. Flange 5 is provided with an annular flange 15 concentric with the shaft 3, and gear 12, and the gear 12 is locked to the shaft 3 by means of the pin 6 which extends through the shaft 3, the shaft 7 and the diametrically disposed recesses 16 in the flange 15. Therefore it will be seen during the rotation of the transmission shaft 3 and the drive shaft 8, the speedometer operating gear 12 will be simultaneously rotated. By disposing the gear 12 within the transmission casing 2, it will be seen it is positively protected from dirt and grit at all times, and it will be thoroughly lubricated by lubricant within the transmission casing, therefore wear on the gearing is obviated as is the common difficulty at present experienced where the speedometer is driven by a gear on one of the ground engaging wheels. Extending outwardly from one side of the annular flange 11 are spaced lugs 17, in bearings 18 of which the shaft 19 is rotatably mounted, and which shaft is provided with a worm gear 20 which meshes with the gear ring 12 and is driven by said gear ring during the rotation of the transmission shaft 3. Shaft 19 extends upwardly and inclines inwardly towards the longitudinal center of the transmission casing 2 and has detachably connected thereto at 21 a similarly inclined shaft 22, which shaft has its upper end rotatably mounted in bearings 23 of the removable transmission casing cover 24, therefore it will be seen that all of the driving gears are disposed within the transmission casing. The upper end of the shaft 22 terminates in a flexible drive shaft 25, which shaft extends through the conventional form of flexible pipe 26 to the speedometer 27 which may be disposed in any suitable position. The flexible drive shaft 26 allows freedom of movement of the parts and the speedometer to be disposed in any desired position.

From the above it will be seen that means is provided for driving a speedometer from gearing disposed within the transmission casing where it is positively protected from grit and foreign matter and the transmission is not materially modified in structure, and the parts are supported by the inner casing of the universal joint, and the device may be easily and quickly attached to the casing.

The invention having been set forth what is claimed as new and useful is:—

1. The combination with the inner universal joint casing carried by one end of a transmission casing, a transmission drive shaft extending through said casing, a speedometer, a cover carried by the casing, of an annular flange carried by the joint casing and surrounding the transmission shaft, a gear rotatably mounted within said annular flange, and extending around the transmission shaft and engaging the joint casing, a flange carried by the joint casing and through which the transmission shaft extends, a flange carried by the gear in spaced relation to the gear, a pin extending through recesses of the last named flange and the drive shaft, a gear rotatably mounted in bearings carried by the first mentioned flange and meshing with the first mentioned gear on the inner side thereof, and shaft driving connections between said flange carried gear and the speedometer and extending through the cover of the transmission casing.

2. The combination with a transmission drive shaft disposed within a casing and extending through a forward universal joint casing section, a speedometer, of driving connections between the drive shaft and the speedometer, said driving connections comprising an annular flange carried by the joint casing section and extending into the transmission casing, a gear rotatably mounted within the annular flange, driving connections between said gear and the transmission drive shaft, a tangentially disposed gear carried by the annular flange, a cover carried by the transmission casing, a shaft extending through said cover and connected to the tangential gear and a flexible driving connection between the last named shaft and the speedometer.

In testimony whereof I have signed my name to this specification.

ARTHUR WATTERSON EWING.